US008924526B1

(12) United States Patent
Levy et al.

(10) Patent No.: US 8,924,526 B1
(45) Date of Patent: Dec. 30, 2014

(54) SYSTEM, METHOD, AND COMPUTER PROGRAM FOR MANAGING SERVICES FOR A SERVICE PROVIDER AT A DEVICE WITHIN PROXIMITY TO A LOCATION OF THE SERVICE PROVIDER, UTILIZING LOGIC OF A CENTRALIZED ENVIRONMENT

(75) Inventors: Nir Levy, Tel Aviv (IL); Zvi Naggan, Maccabim (IL)

(73) Assignee: Amdocs Software Systems Limited, Dublin (IE)

(*) Notice: Subject to any disclaimer, the term of this patent is extended or adjusted under 35 U.S.C. 154(b) by 72 days.

(21) Appl. No.: 12/643,891

(22) Filed: Dec. 21, 2009

(51) Int. Cl.
*G06F 15/173* (2006.01)

(52) U.S. Cl.
USPC .......................................................... 709/223

(58) Field of Classification Search
USPC .......................................................... 709/223
See application file for complete search history.

(56) References Cited

U.S. PATENT DOCUMENTS

| | | | |
|---|---|---|---|
| 6,856,676 B1* | 2/2005 | Pirot et al. ............... | 379/201.01 |
| 6,871,232 B2* | 3/2005 | Curie et al. ................... | 709/225 |
| 7,333,942 B1* | 2/2008 | Cowles ...................... | 705/26.62 |
| 2003/0028819 A1* | 2/2003 | Chiu et al. ........................ | 714/5 |
| 2003/0069922 A1 | 4/2003 | Arunachalam ............... | 709/203 |
| 2004/0267927 A1 | 12/2004 | Davis et al. ................... | 709/224 |
| 2005/0180352 A1 | 8/2005 | Gerovski et al. .............. | 370/328 |
| 2006/0143264 A1 | 6/2006 | Payne et al. | |
| 2007/0067297 A1 | 3/2007 | Kublickis | |
| 2008/0046434 A1* | 2/2008 | Nelson .............................. | 707/9 |
| 2009/0182565 A1 | 7/2009 | Erickson et al. | |
| 2010/0042505 A1 | 2/2010 | Straus | |
| 2010/0103837 A1* | 4/2010 | Jungck et al. ................. | 370/252 |

FOREIGN PATENT DOCUMENTS

| | | | |
|---|---|---|---|
| WO | 0199446 A1 | 12/2001 | |
| WO | 2005/055092 | 6/2005 | .............. G06F 17/30 |

OTHER PUBLICATIONS

Gouscos, D. et al. "An Approach to Modeling Web Service QoS and Provision Price" WISEW'03. pp. 1-10. IEEE, 2004.*
Sotomayor, B. et al. "Virtual Infrastructure Management in Private and Hybrid Clouds". pp. 14-22. IEEE, Sep. 2009.*
Baharav, Y. et al., U.S. Appl. No. 12/643,886, filed Dec. 21, 2009.
Non-Final Office Action from U.S. Appl. No. 12/643,886, dated Oct. 24, 2013.
Final Office Action from U.S. Appl. No. 12/643,886, dated Jan. 4, 2013.
Advisory Action from U.S. Appl. No. 12/643,886, dated Apr. 11, 2013.
Final Office Action from U.S. Appl. No. 12/643,886, dated May 12, 2014.
Non-Final Office Action from U.S. Appl. No. 12/643,886, dated Jun. 22, 2012.
Advisory Action from U.S. Appl. No. 12/643,886, dated Oct. 22, 2014.

\* cited by examiner

*Primary Examiner* — John Macilwinen
(74) *Attorney, Agent, or Firm* — Zilka-Kotab, PC

(57) ABSTRACT

A system, method, and computer program product are provided for managing services for a service provider at a device within proximity to a location of the service provider, utilizing logic of a centralized environment. In use, at least one real-time service managed for a service provider by a centralized environment is identified. Furthermore, logic of the centralized environment for the management of the at least one real-time service is deployed to at least one device within a predetermined proximity to a location of the service provider.

18 Claims, 8 Drawing Sheets

SYSTEM, METHOD, AND COMPUTER PROGRAM FOR MANAGING SERVICES FOR A SERVICE PROVIDER AT A DEVICE WITHIN PROXIMITY TO A LOCATION OF THE SERVICE PROVIDER, UTILIZING LOGIC OF A CENTRALIZED ENVIRONMENT

FIELD OF THE INVENTION

The present invention relates to application tools, and more particularly to application tools for content development and/or content deployment.

BACKGROUND

Traditionally, content development and/or content deployment have been limited based on the tools made available to a developer. For example, a content developer has generally been required to develop content for a particular device platform that is to be deployed using a particular service of a particular service provider. Unfortunately, requiring content to be developed for such a particular device platform, service, service provider, etc. severely diminishes the size of the market to which the content may be deployed, while developing separate content for each different combination of device platforms, services, service providers, etc. results in a prohibitively high cost of developing, and even marketing, the content.

There is thus a need for addressing these and/or other issues associated with the prior art.

SUMMARY

A system, method, and computer program product are provided for managing services for a service provider at a device within proximity to a location of the service provider, utilizing logic of a centralized environment. In use, at least one real-time service managed for a service provider by a centralized environment is identified. Furthermore, logic of the centralized environment for the management of the at least one real-time service is deployed to at least one device within a predetermined proximity to a location of the service provider.

DETAILED DESCRIPTION

Figure 1:
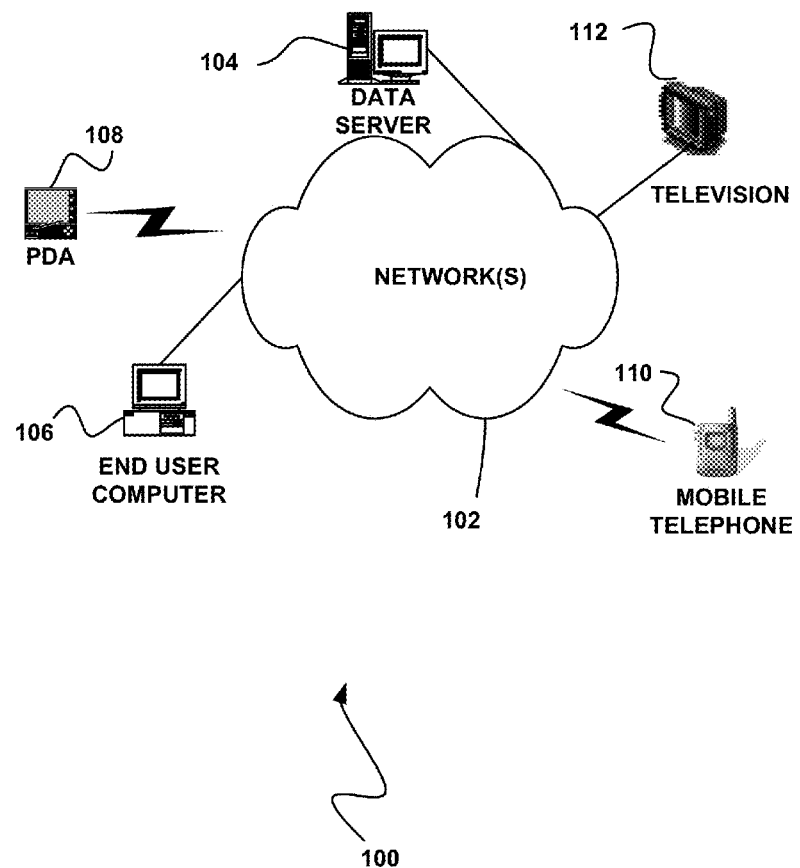
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
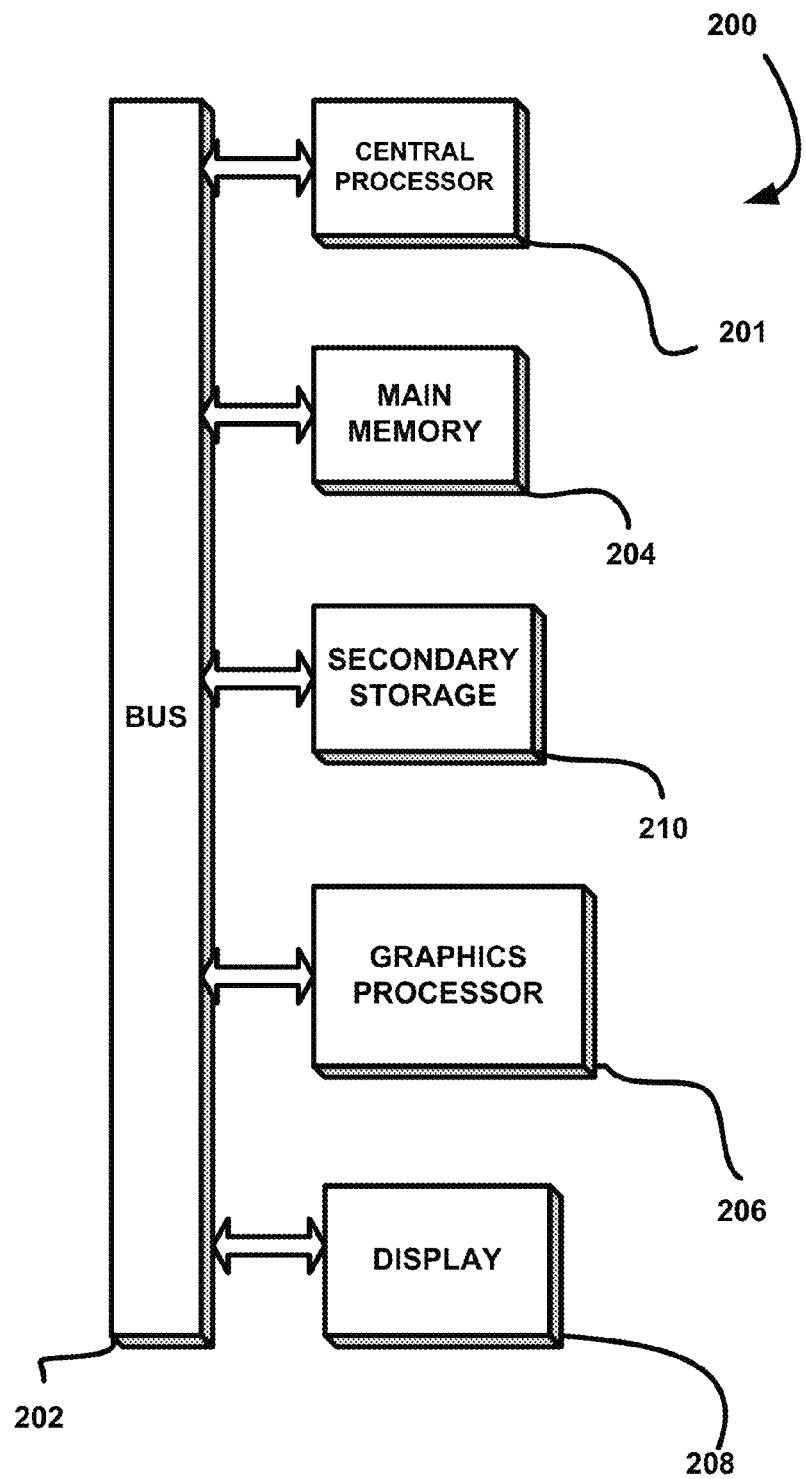
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
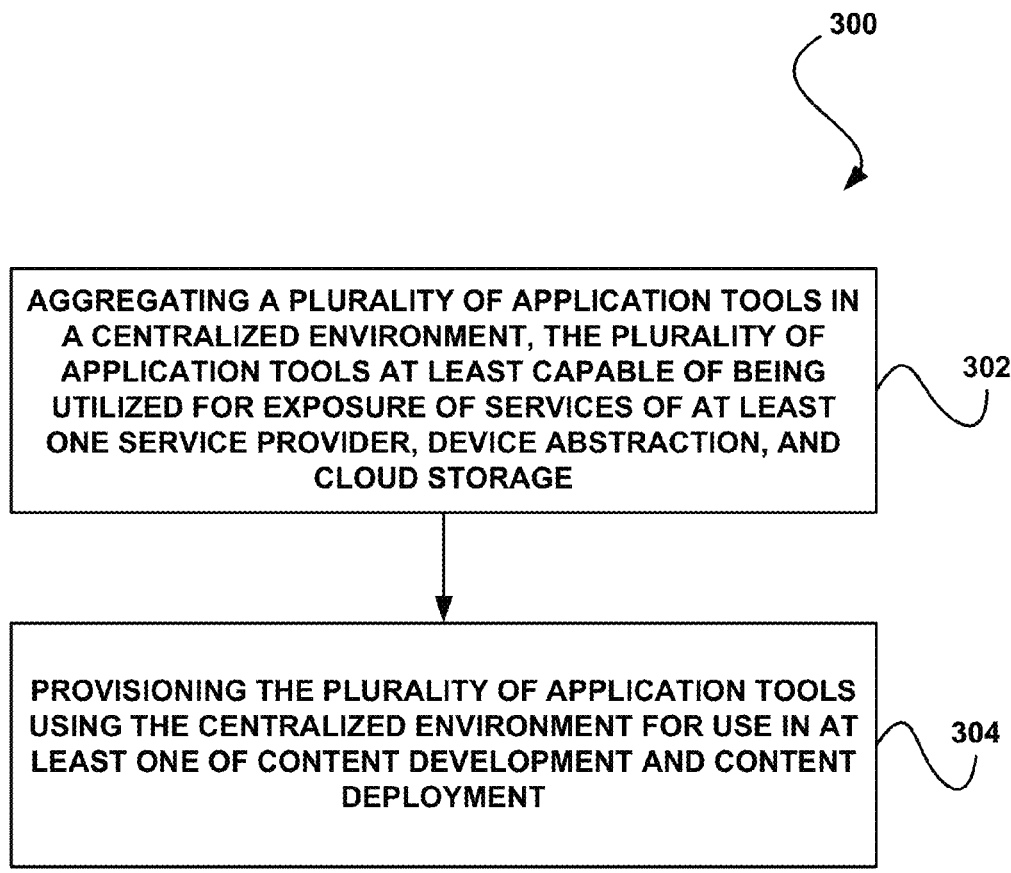
FIG. 3 illustrates a method for provisioning application tools in a centralized environment for use in content development and/or content deployment, in accordance with one embodiment.

FIG. 3 illustrates a method 300 for provisioning application tools in a centralized environment for use in content development and/or content deployment, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a plurality of application tools is aggregated in a centralized environment, where the plurality of application tools are at least capable of being utilized for exposure of services of at least one service provider, device abstraction, and cloud storage. With respect to the present description, the centralized environment may include any environment capable of aggregating the application tools, such that the application tools are capable of provisioned in a collective manner from the centralized environment. For example, the centralized environment may include the application tools and a platform for executing the application tools.

To this end, the centralized environment may be located on a server and/or any other device on a network (e.g. such as any of the devices described above with respect to FIGS. 1 and/or 2).

In one embodiment, the application tools capable of being utilized for exposure of services of the service provider may include at least one interface [e.g. application program interface (API)] of the service provider that exposes the services of the service provider. For example, the services may be exposed such that the services may be utilized with respect to development and/or deployment of content. It should be noted that the service provider may include any provider of at least one service, as a telecommunications service provider, etc. Thus, as an option, the services of the service provider may include telecommunications services [e.g. call routing, delivery, short message service (SMS), etc.], voice over Internet Protocol (VoIP) services (VAS), and/or any other services capable of being provided by the service provider.

In another embodiment, the application tools capable of being utilized for exposure of services of the service provider may include an extraction tool for extracting from a service aggregator a plurality of interfaces of any number of different service providers that expose the services of such service providers. Optionally, the service aggregator may include an SMS aggregator that aggregates different SMS services provided by at least one service providers, a location-based services (LBS) aggregator that aggregates different location-based services across at least one service provider, etc. As another option, the service aggregator may be provided by a third party separate from the service providers for which the services are aggregated.

In yet another embodiment, the application tools capable of being utilized for device abstraction may include at least one interface providing access to a presentation layer of each of a plurality of devices with different platforms. The plurality of devices may include mobile devices, desktop devices, and/or any devices on which content may be presented via the presentation layer associated therewith. In various embodiments, the interface providing access to the presentation layer of the devices with different platforms may be capable of being utilized for rendering platform-independent content on each of the plurality of devices with different platforms. Just by way of example, the application tools capable of being utilized for device abstraction may include Silverlight™ by Microsoft®, Flash® by Adobe®, etc.

In still yet another embodiment, the application tools capable of being utilized for cloud storage may include memory for storing content, at least one interface for accessing such memory, a security system for security storing the content, etc. With respect to the present description, the cloud storage may include any storage in a cloud (e.g. the Internet), such that the storage may be accessible via the cloud. While the centralized environment is described above as including the application tools for exposure of services of at least one service provider, device abstraction, and cloud storage, any other desired application tools may also be included in the centralized environment. For example, the application tools in the centralized environment may further include tools for testing content, tools for enforcing security, tools for enabling payments between parties, ad tools for reporting, etc.

Table 1 illustrates various other purposes for which application tools in the centralized environment may be capable of being utilized. Of course, it should be noted that such uses of the application tools are set forth for illustrative purposes only, and thus should not be construed as limited in any manner.

TABLE 1

Mediation between parties [e.g. which may have the ability to communicate with user devices such as computers and cell phones, with customer service providers' (CSPs) networks and/or active application service provider (ASP)/Web Services]
Support for any of the other applications tools (e.g. via testing, on boarding, service level agreement (SLA) policies, etc.); may include a set of SDKs [plug into standard integrated development environment (IDE)] and documentation, as well further support in the form of a developer community, along with productivity tools such as test harnesses or simulators which facilitate development without requiring access to a server of the centralized environment.
Certification - supporting the process of certifying an application starting with submitting application by developer until certification and inclusion in centralized environment content inventory. There may be different level of certifications.
A run time component that receives the request to execute a centralized environment API. This component may manage the run time aspects either directly or by invoking the relevant centralized environment components
Security & Policy enforcement (regulatory and/or contractual)
Authentication, authorization and accounting (AAA) functionality
Managing settlements and/or payments between parties
On boarding and management functionality
Accounting and reporting functionality
Discovery and publishing functionality
Storefront capabilities - A white label Portal that can be branded by service providers/enterprise, including access to the content of the centralized environment; enabling the service provider to manage the interface for selling content, creating the personalized display, defining rules for managing the content, uploading exclusive content, etc.; Enabling the handling of the user experience for content purchase including the storefront on the device, the discovery experience (how content displayed on the storefront, push/pull etc), the actual management of the purchase from including quoting of price, handling payment (including taxation issues), logging the purchase and any follow up activities such as disputes
deployment- Delivering the content to the user device including aspects of transcoding, delivering the correct version based on customer device, handling digital rights management (DRM) aspects, etc.
Portal front end - A portal used as the developer interface to the centralized environment for the purpose of downloading tools, communication with other developers, registering for using centralized environment API, launch of any other relevant applications.
activation- Handling any aspect requiring provisioning settings in service provider environment such as triggering setting data plan, AAA updates, etc. The activation can be triggered at purchase or $1^{st}$ consumption.

Further, as shown in operation 304, the plurality of application tools is provisioned using the centralized environment for use in at least one of content development and content deployment. With respect to the present description, content development may include any development (e.g. creation, etc.) of content and content deployment may include any deployment (e.g. provision to users, etc.) of content. It should be noted that such content may include any desired type of content, such as applications (software), advertisements, video, graphical images, audio, etc.

Optionally, provisioning the application tools for use in the content development and/or content deployment may include making the application tools accessible via the centralized environment for use in the content development and/or content deployment. For example, the application tools may be made accessible to content developers, content providers, end users, etc. Of course, however, the application tools for use in the content development and/or content deployment may be provisioned in any desired manner.

In one embodiment, provisioning the application tools for use in the content development and/or content deployment may include the centralized environment storing content using the cloud storage from which the content is deployed. Just by way of example, the centralized environment may deploy the content stored in the cloud storage to an end user device. In this way, the end user device may receive, utilize, etc. the content from the cloud storage.

In another embodiment, the centralized environment may use the exposure of the services of the service provider and the device abstraction to deploy the content from the cloud storage. The centralized environment may optionally deploy the content to the end user device by selecting at least one of the exposed services of the service provider that is used by the end user device, such that the selected exposed service(s) may be used in deploying the content to the end user device. In this way, a service that the end user device is configured (e.g. adapted) to utilize may be employed when deploying the content to the end user device.

As another option, the centralized environment may deploy the content to the end user device by using the device abstraction to select a presentation layer that is used by the end user device. Furthermore, the selected presentation layer may be used in presenting (e.g. displaying, audibly providing, etc.) the content on the end user device. Accordingly, a presentation layer that the end user device is configured to utilize for presenting content may be selected via the device abstraction for deploying the content to the end user device.

In yet another embodiment, at least a portion of the application tools in the centralized environment may be provisioned such that they enable a content developer to develop platform-independent content. As an option, the platform-independent content may include an application capable of being executed on the end user device. As another option, the platform-independent content may include an advertisement.

For example, the content developer may develop content that is independent with respect to a platform of an end user device on which it may be presented, and optionally a platform of a service over which it is capable of being provided to the end user device (e.g. a service used by the end user device). As a further example, the application tools may be utilized to automatically configure the content for a particular platform (e.g. device platform and service platform) based on the end user device to which it is going to be deployed. In this way, the application tools may enable the content developer to develop the platform-independent content by configuring the content for the content developer based on the end user device in the manner described above.

In still yet another embodiment, at least a portion of the application tools in the centralized environment may be provisioned such that they enable deployment of the platform-independent content across a plurality of different service providers. For example, as noted above, the content may be deployed based on the platform of the service used by the end user device. With respect to such example, the content may be deployed via the particular service used by the end user device. As another example, the content may be deployed from the cloud storage.

To this end, the development and deployment of content (e.g. mobile enabled applications) may be provided for any wireless capable devices (e.g. cell phones, networked computing device, etc.) over any service (e.g. service provider network) using the application tools. of the centralized environment. In this way, new mutli-party service provider enriched applications may be developed and deployed rapidly via the centralized environment, in a cost efficient and timely manner, reaching a broader audience than an application developed for a single device platform and service platform, and providing new revenue opportunities both to the service developers as well the service provider.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
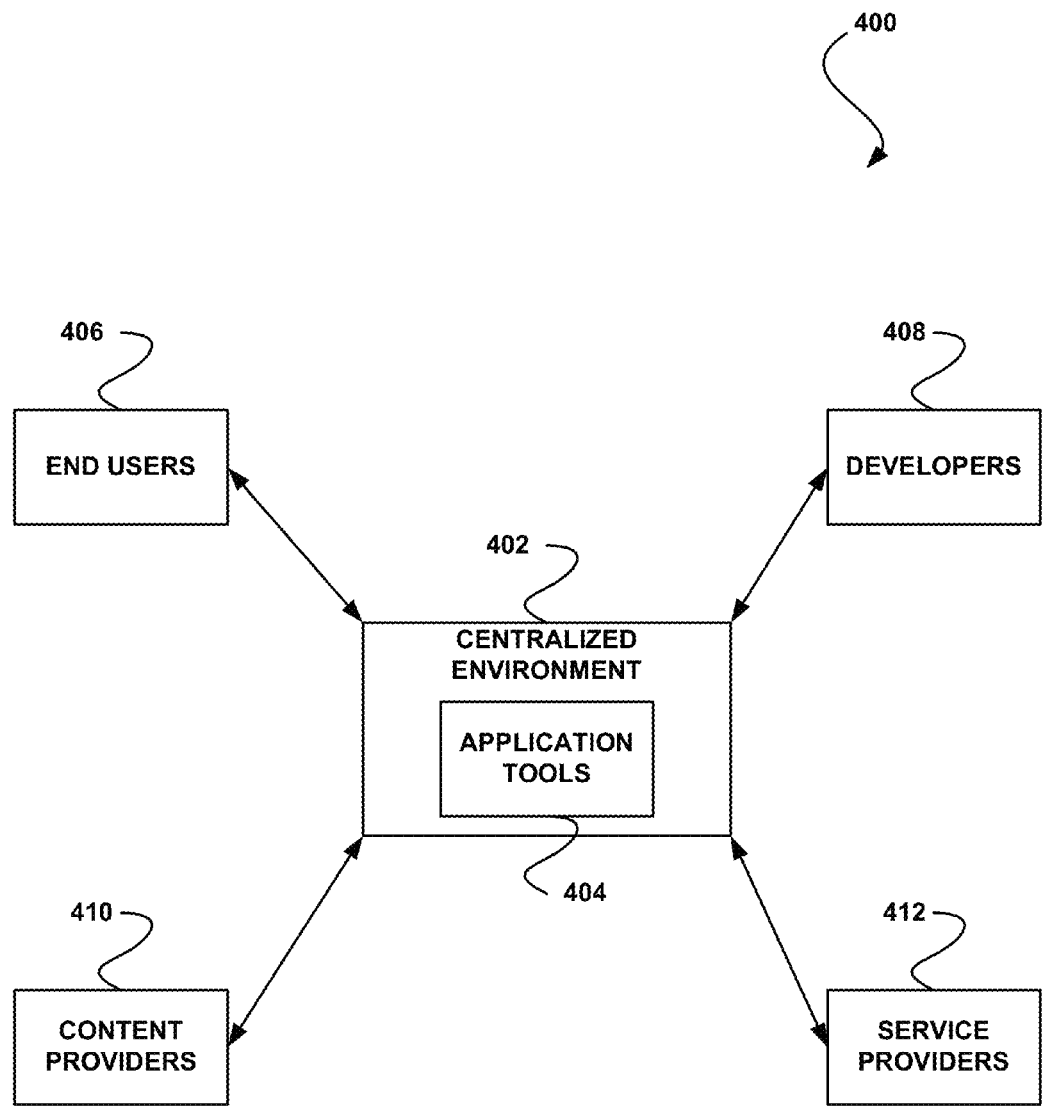
FIG. 4 illustrates a system for provisioning application tools in a centralized environment for use in content development and/or content deployment, in accordance with another embodiment.

FIG. 4 illustrates a system 400 for provisioning application tools in a centralized environment for use in content development and/or content deployment, in accordance with another embodiment. As an option, the system 400 may be implemented in the context of the details of FIGS. 1-3. Of course, however, the system 400 may be implemented in any desired environment. Further, the aforementioned definitions may equally apply to the description below.

As shown, a centralized environment 402, including application tools 404, is in communication with end users 406, developers 408, content providers 410, and service providers 412. With respect to the present embodiment, such communication may be provided over a network (e.g. the Internet). In various embodiments, the centralized environment 402 may include a single server, a group of servers (e.g. over which the application tools 404 are distributed), etc. Also, in the context of the present embodiment, the application tools 405 are at least capable of being utilized for exposure of services of at least one service provider 412, device abstraction, and cloud storage. In other exemplary embodiments, the tools may be capable of being utilized for commercialization of content by including tools for merchandising, brokering, deliver, payment for the content, services consumed, etc.

In one embodiment, developers 408 (e.g. ASPs) may develop platform-independent content and communicate the same to the centralized environment 402. Using the cloud storage, the centralized environment 402 may store the platform-independent content. Further, the centralized environment 402 may deploy the content to end user devices 406 with different types of platform and using different types of services (e.g. from different service providers 412, etc.). For example, the centralized environment 402 may utilize the exposure of services of the service providers 412 and the device abstraction to deploy the content to end user devices 408 using the device platform and service associated with such end user devices 408.

Thus, the centralized environment 402 may provide the developers 408 with a single integration to multiple service providers 410. Further, the centralized environment 402 may provide the developers 408 with standard access to a rich API set, such as telecommunications APIs and/or VAS APIs, to optionally create smart web and mobile applications. For example, the centralized environment 402 may provide the developers 408 with a single environment for accessing application tools 404 exposing services of at least one service provider 412, device abstraction, and cloud storage, such that the developers 408 may deploy their developed content to broader audience. Optionally, the application tools 404 of the centralized environment 402 may further include tools for coding, testing, distribution to payment, etc.

Moreover, the end users 406 may use the centralized environment 402 for accessing (e.g. receiving, downloading, etc.) content specific to the platform of their devices and the service used by their devices. Thus, the centralized environment 402 may provide a single environment via which content may be received for use on multiple different devices, and may provide a single environment for run-time needs of the end users 406. In various embodiments, the end users 406 may include employees of a company, independent users, etc. Optionally, the end users 406 may receive the content from the cloud storage of the centralized environment 402. In one embodiment, the cloud storage may be secure and/or the centralized environment 402 may employ security tools for deploying the content to the end users 406 in a secure manner.

Still yet, the service providers 412 may utilize the centralized environment 402 for exposing their services, which may allow those services to be monetized by the developers 408 by enabling the developers 408 to have the exposed services embedded in their applications. Allowing the developers 408 to develop content for use across multiple service platforms and devices may creates loyalty in the centralized environment 402, and thus to the service provider 412, that is not based solely on the device being utilized by the end user 406. Further, it may enable creation of a rich portfolio of services and content driving higher average revenue per user (ARPU) and new business, and may create a relationship with developers to drive revenue from business customers.

As an option, the content providers 410 (e.g. Web service providers, advertisement providers, etc.) may also utilize the centralized environment 402 for various purposes. For example, the content providers 410 may be provided with a broader distribution channel for their service allowing for mash up applications and revenue streams including non-mobile implementations (e.g. geo fencing network operations center). In various embodiments, the content providers 410 may utilize the centralized environment 402 for sending content to a mass addressable audience through multiple service providers, for accessing a rich profiling data (of the end users 406) for targeted advertisements, etc. Just by way of example, when an end user 406 receives content from the centralized environment 402, the content provider 410 may provided with an opportunity to transmit other content of content provider 410 (e.g. an advertisement) to the end user 406.

In one embodiment, the service providers 412 may include existing end user databases that already have information available for segmentation, usage, profiling, etc. The content developed by the developers 408 may anonymized with respect to the developer 408 may stored in the cloud storage for use by the end users 406 in a manner that can benefit the service providers 412 by providing content for use by the end users 406 via services of the service providers 412. The centralized environment 402 may optionally provide a service (e.g. by consent of the end users 406) for commercializing existing user profiles maintained by the service providers 412 to the content providers 410 (e.g. for use in the context of paid advertising or promotion in exchange for free services or promotions) by disclosing portions of the user profile (e.g. gender, age, music preference, etc.).

To this end, the centralized environment 402 may create a marketplace for service provider 412 services and content, enabling many-to-many relationships between the end users 406, service providers 412, developers 408, and content providers 410. Furthermore, as noted above, the centralized environment 402 may facilitate the creation, operation and monetization of services and content, derived from access to combined assets (e.g. exposed services, device abstraction, cloud storage, etc.), while intrinsically providing any (optionally necessary) components to content development and/or content deployment in a cost and time efficient way for allowing different end users 406 to take part in a worldwide marketplace of content.

Figure 5:
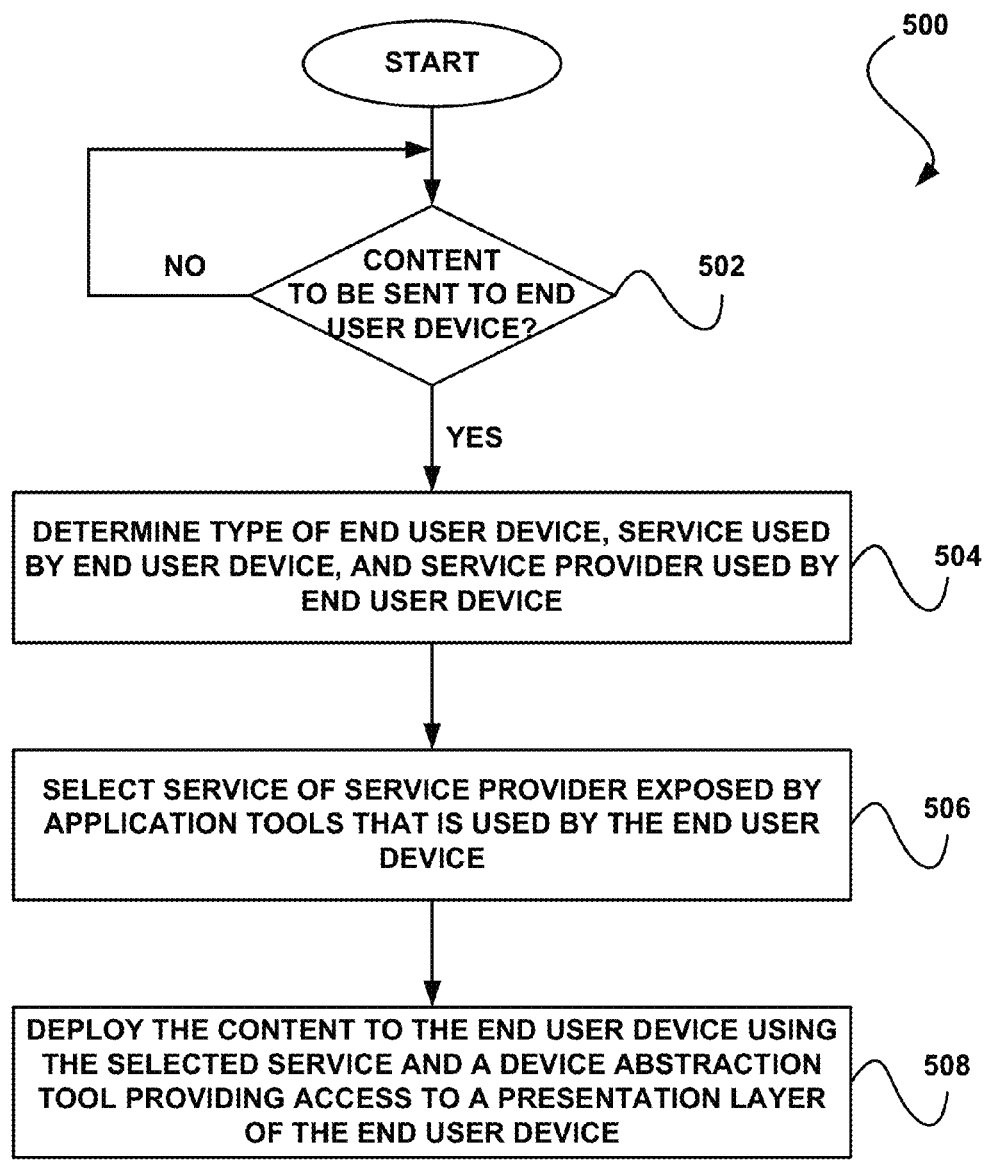
FIG. 5 illustrates a method for deploying content using application tools in a centralized environment, in accordance with yet another embodiment.

FIG. 5 illustrates a method 500 for deploying content using application tools in a centralized environment, in accordance with yet another embodiment. As an option, the method 500 may be carried out in the context of the details of FIGS. 1-4. For example, the method 500 may be carried out by the centralized environment of FIG. 4. Of course, however, the method 500 may be carried out in any desired environment. Further, the aforementioned definitions may equally apply to the description below.

As shown in decision 502, it is determined whether content is to be sent to an end user device. In one embodiment, the decision may be based on whether a request deploy content to the end user device has been received. Optionally, the request may be received from the end user device for receiving specific content, or may be received from a content provider, service provider, etc. for sending the specific content to the end user device (e.g. based on a policy indicating that the specific content is to be sent to the end user device, etc.).

If it is determined that content is not to be sent to an end user device, the method 500 continues to wait for it to be determined that content is to be sent to an end user device. If however, it is determined that content is to be sent to an end user device, a service used by the end user device and a service provider used by the end user device are determined. Note operation 504. For example, a network to which the end user device is connected may be identified, which may indicate the service of the network and the service provider providing the network.

Additionally, as shown in operation 506, a service of the service provider that is used by the end user device and which is exposed by application tools is selected. For example, the application tools which expose services provided by service providers may be searched for the service provider used by the end user device, and further the service of such service provider used by the end user device. Upon selection of the service, the content is deployed (e.g. communicated, downloaded, etc.) to the end user device using the selected service and a device abstraction tool providing access to a presentation layer of the end user device 508. For example, the content may be configured using the device abstraction tool for enabling the content to be presented by the presentation layer of the end user device. In this way, the content may be deployed to the end user device based on the device platform and service used by the end user device.

Figure 6:
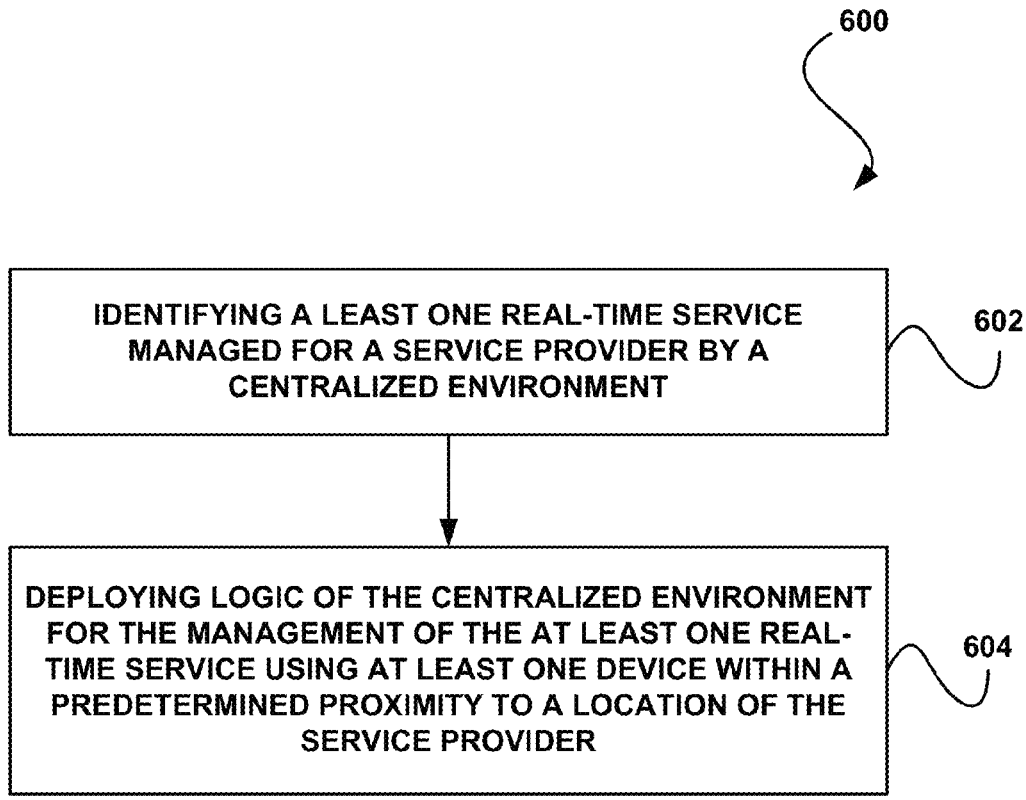
FIG. 6 illustrates a method for managing services for a service provider at a device within proximity to a location of the service provider, utilizing logic of a centralized environment, in accordance with another embodiment.

FIG. 6 illustrates a method 600 for managing services for a service provider at a device within proximity to a location of the service provider, utilizing logic of a centralized environment, in accordance with another embodiment. As an option, the method 600 may be carried out in the context of the details of FIGS. 1-5. For example, the method 600 may be carried out by the centralized environment of FIG. 5. Of course, however, the method 600 may be carried out in any desired environment. Further, the aforementioned definitions may equally apply to the description below.

As shown in operation 602, at least one real-time service managed for a service provider by a centralized environment is identified. With respect to the present embodiment, the centralized environment includes any environment managing services, including the at least one real-time service, of at least one service provider (e.g. communications service provider, etc.). Thus, the centralized environment may manage services of a plurality of service providers, as an option.

For example, the centralized environment may include a third party environment separate from the service provider that manages services of the service provider(s). Optionally, the centralized environment may manage the services by providing the services to customers of the service provider. As another option, the centralized environment may manage the services by maintaining the services for use by the service provider (or the customers thereof).

It should be noted that while the services that may be managed by the centralized environment include the identified real-time service noted above, the services may also include non-real-time services. Such non-real-time services may include any services provided by the centralized environment in non-real-time, with respect to the present description. For example, the non-real-time services may include messaging, updating, browsing, backing up data, augmenting information during browsing, etc.

Also with respect to the present description, the real-time services managed for a service provider may include any services that are provided by the centralized environment in real-time. Optionally, the real-time services may be dependent on network events. Just by way of example, the real-time services may include call control (e.g. three-way calling, etc.), video control, etc.

To this end, the real-time service may optionally be identified from a plurality of the services (e.g. real-time services and non-real-time services) managed for the service provider by the centralized environment. For example, the real-time service may be identified utilizing an indicator associated therewith which indicates that such service is provided in real-time. Of course, the real-time service may be identified in any manner that distinguishes such service from the non-real-time services. Furthermore, the real-time service may be identified by the centralized environment, the reasons for which will be described in more detail below.

Furthermore, as shown in operation 604, logic of the centralized environment for the management of the at least one real-time service is deployed to at least one device within a predetermined proximity to a location of the service provider. It should be noted that the aforementioned logic may include any logic (e.g. computer code, etc.) provided (e.g. developed, etc.) by the centralized environment that is executable for managing the identified real-time service. Accordingly, the logic of the centralized environment may be executable by the device to which it is deployed (e.g. transmitted, etc.) for managing the real-time service.

In one embodiment, the logic may be deployed to the device within the predetermined proximity to the location of the service provider by transmitting such logic to the device. For example, the logic may be deployed over a network. As another example, the logic may be deployed logic may be deployed to the device as a packaged application. Of course, however, the logic may be deployed to the device in any desired manner.

As noted above, the device to which the logic is deployed is within the predetermined proximity to the location of the service provider. Such location of the service provider may include a geographical location of the service provider. To this end, in one embodiment, the predetermined proximity may include a geographical region (e.g. city, state, country, etc.) including the location of the service provider (e.g. at which the service provider is located).

In another embodiment, the predetermined proximity may include the location of the service provider such that the logic of the centralized environment is deployed to a device located at a premise of the service provider. Just by way of example, the device may include a device of the service provider. With respect to such example, the service provider may provision the logic of the centralized environment.

In this way, the centralized environment may distribute the logic utilized for managing the real-time service such that it is within a predetermined proximity of the service provider for which such real-time service is managed. By doing so, the real-time nature of the real-time service may be maintained (e.g. by maintaining a real-time response to network events, by ensuring real-time constraints are met, etc.). For example, the real-time service may be provisioned locally, such that delay in provisioning the real-time service (e.g. due to a geographical distance over which the real-time service is provisioned, network delays associated with such geographical distance, etc.) is reduced.

Figure 7A:
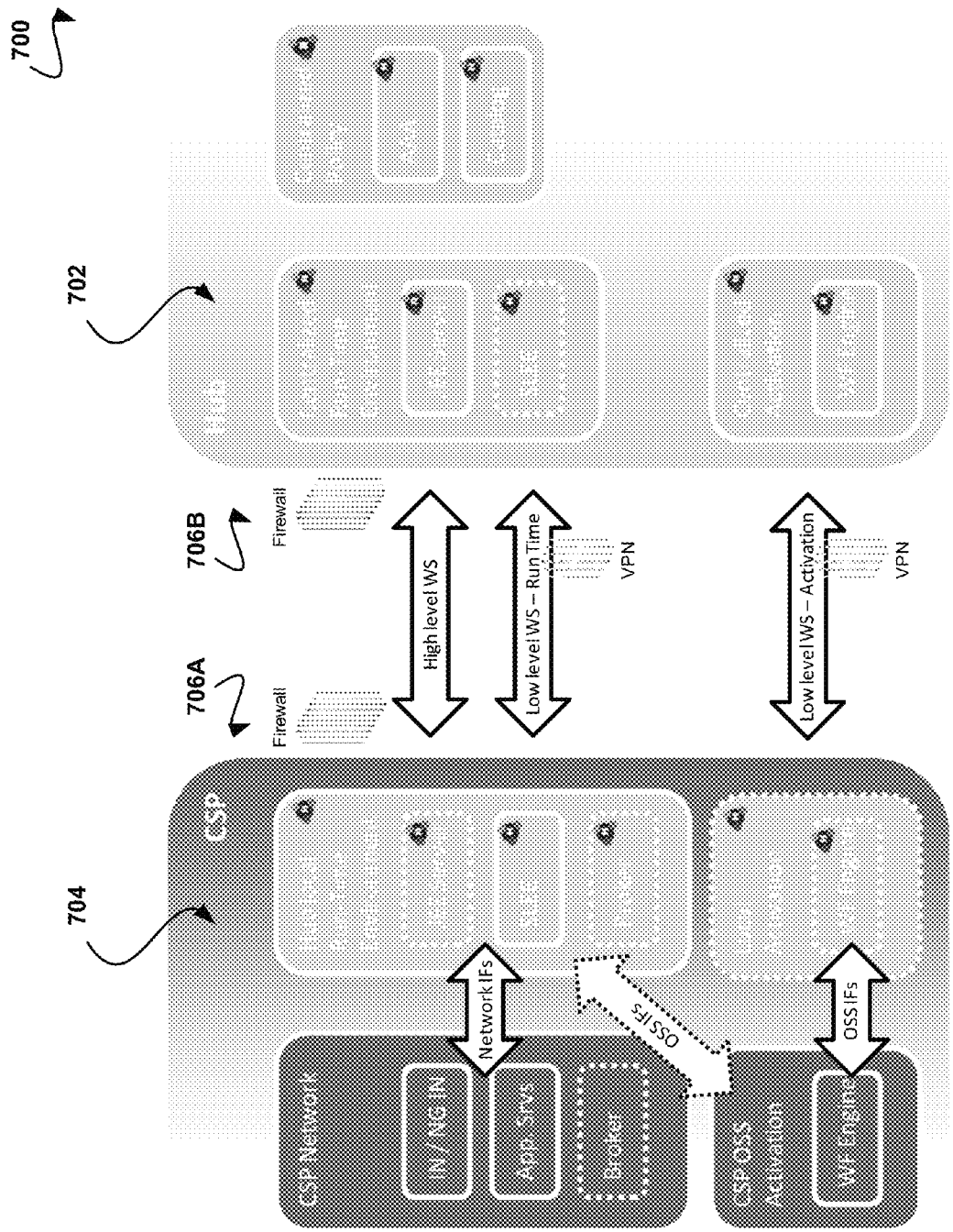
FIGS. 7A-B illustrate a system for managing services for a service provider at a device within proximity to a location of the service provider, utilizing logic of a centralized environment, in accordance with yet another embodiment.
Figure 7B:
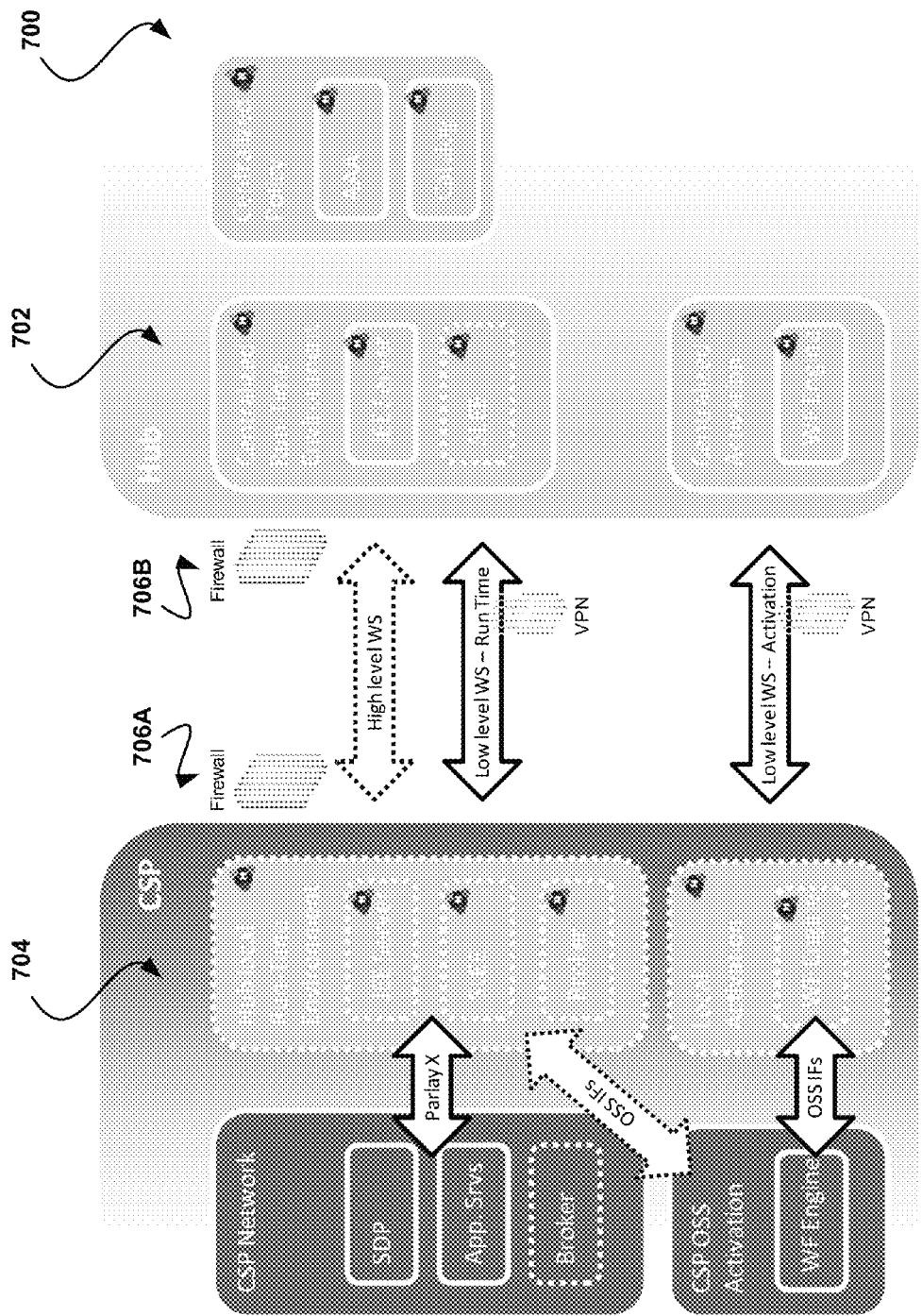

FIGS. 7A-B illustrate a system 700 for managing services for a service provider at a device within proximity to a location of the service provider, utilizing logic of a centralized environment, in accordance with yet another embodiment. As an option, the system 700 may be implemented in the context of the details of FIGS. 1-6. Of course, however, the system 700 may be implemented in any desired environment. Again, the aforementioned definitions may equally apply to the description below.

As shown in FIG. 7A, a centralized environment (hereinafter a hub 702) is in communication with a service provider [hereinafter customer service provider (CSP) 704]. As shown, the hub 702 and the CSP 704 may be in communication over a network (e.g. the Internet, etc.). Further, communications between the hub 702 and the CSP 704 may be managed (e.g. filtered, etc.) according to a policy via a firewall 706A, 706B located at a premise of each of the hub 702 and the CSP 704.

With respect to the present embodiment, the hub 702 may identify a real-time service being managed for the CSP 704. Further, the hub 702 may deploy logic for managing such service to a device within a predetermined proximity to the CSP 704. As shown, such predetermined proximity may include a premise of the CSP 704. In this way, the logic for managing the real-time service may be executed at the premise of the CSP 704 such that the real-time service may be managed locally with respect to users of the real-time service (e.g. customers of the CSP 704).

In one embodiment, the logic for managing the real-time service may be deployed to an application server of the CSP 704. Such application server may be connected to the network for communicating to the hub 702. For example, the application server may be connected to the network for receiving the logic for managing the real-time service from the hub 702. As another example, the application server may be connected to the network for reporting to the hub 702 various information, such as settlements between parties, operation control with respect to the provisioning of the real-time service, delays with respect to the provisioning of the real-time service, etc.

Further, the application server of the CSP 704 may utilize standardized interfaces for communicating with devices that are utilizing the real-time service. The standard interfaces may include, for example, Signaling System #7 (SS7) or Internet protocol (IP) based signaling links for communicating with the devices that are utilizing the real-time service. These standardized interfaces may allow the CSP 704 to utilize real-time protocols for providing the real-time service in real-time.

Further, the hub 702 may execute logic for managing non-real-time services for the CSP 704. Thus, the non-real-time services may be provisioned at a premise of the hub 702. In one embodiment, the hub 702 may itself be distributed across a plurality of devices of the hub 702. To this end, with respect to such embodiment, the non-real-time services may be provisioned across the devices of the hub 702.

It should be noted that while the hub 702 is shown as only being in communication with a single CSP 704, the hub 702 may be in communication with any number of different CSPs 704. As an option, the hub 702 may logically separate the logic for managing non-real-time services for the various CSPs 704, based on the CSP 704. As another option, the hub 702 may physically separate (e.g. across the distributed hub 702 devices) the logic for managing non-real-time services for the various CSPs 704, based on the CSP 704.

As shown, the CSP 704 has a service delivery platform for exposing web services. High level web services generated by the various applications (e.g. provided by the hub 702) are routed through the hub 702 to the CSP 704. The web services may activate run-time logic within the service logic execution environment (SLEE) server and Java™ execution environment (JEE) server provided to the CSP 704 by the hub 702 that will orchestrate the various network service elements deployed at the CSP 704. Thus, the SLEE/JEE may be located at the 704 premises. If there are no run-time services to be executed, the SLEE/JEE may be located at the hub 702.

Optionally, a service broker may also be deployed by the CSP 704. As another option, the CSP 704 may connect to an existing service broker so that all the services managed by the hub 702 are bundled with existing ones [e.g. pre-paid, virtual private network (VPN), etc.]. In one embodiment, the CSP 704 located SLEE and optionally the JEE server may use low level web services (more granular) to communicate with the hub 702. Both high level web services and low level web services may be secured utilizing physical and application level mechanisms, as an option. In addition, a hub 702 run-time environment may be used for an activation process as desired.

Further, the hub 702 may enable efficient connection of the CSP 704 to the hub 702 by using a component on the CSP 704 that abstracts the specific CSP 704 for exposing a predefined standard set of application program interfaces (APIs) used by the hub 702. For example, the component may be preconfigured to provide the standard interfaces defined by the hub 702. As another example, the component may enable the CSP 704 to create additional application/services (e.g. utilizing application tools of the hub 702). In various embodiments, the component may perform a plurality of functions on the CSP 704, such as those that utilize real-time communication aspects such as policy management, security aspects (e.g. data privacy), the locally deployed logic for managing real-time services, etc.

Table 2 illustrates various exemplary features of the aforementioned component. Of course, it should be noted that such features are set forth for illustrative purposes only, and thus should not be construed as limiting in any manner.

TABLE 2

Real time, standard based Service Creation and Execution platform
Ability to abstract any type of network/protocol - SS7/IP/Diameter/etc. as well as cross network aspect (service brokering)
Ability to expose web services at various level of abstraction
Ability to implement business logic using Java format
Ability to integrate smoothly into both network and IT environment
Preconfigured implementation of the standard hub APIs
Extensive library of network protocol adapters
Extensive library of components enabling efficient development of business logic To this end, the hub 702 may allow a CSP 704 that would like to expose its services to a worldwide community of developers to do this in a standard efficient way. Further, the component provided to the CSP 704 may allow creation of a de-facto standard for the CSP 704 to expose assets (e.g. network assets, business support system assets, operational support system assets, etc.), subscriber profile data, quality of service (QoS) control etc. By providing such component to various CSPs 704, the aforementioned standard may be created across the various CSPs 704. Further, the component may allow the CSP 704 to easily connect to the hub 702, to leverage other existing CSP 704 network assets cross SS7 and IP, to providing decoupling between the APIs that CSP 704 provides from the APIs exposed to the developer community, etc.

As shown in FIG. 7B, in order to enable provisioning of services managed by the hub at the CSP 704, the Parlay X web service may be interworked and orchestrated so high-level web services managed by the hub 702 may be emulated. Such interworking/orchestration may be done by the JEE server. Optionally, the JEE server may be located at the CSP 704 premise, at the hub 702 premise, etc. By deploying the SLEE at the CSP 704 premises, additional services managed by the hub 702 may be supported which are not necessarily supported by the existing service delivery platform.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for exposing, by a centralized environment, a first service provided by a first service provider, and further exposing a second service provided by a second service provider, and, as a result of the exposure of the first service and the second service, managing both the first service for the first service provider and the second service for the second service provider;
   computer code for identifying the first service of the first service provider as being a real-time service managed by the centralized environment;
   computer code for identifying the second service of the second service provider as being a non-real-time service managed by the centralized environment; and
   computer code for, in response to the identification of the first service of the first service provider as being the real-time service, deploying, from the centralized environment, logic of the centralized environment for the management of the real-time service to at least one device within a predetermined proximity to a location of the first service provider, wherein the deployed logic of the centralized environment is executable by the at least one device for managing the real-time service locally at the at least one device, such that:
   in response to receipt of a first request to transmit a first content to a first user device and a determination that the first user device utilizes the real-time service provided by the first service provider, the first content is transmitted to the first user device utilizing the deployed logic of the centralized environment at the at least one device within the predetermined proximity to the location of the first service provider, and
   in response to receipt of a second request to transmit the first content to a second user device and a determination that that the second user device utilizes the real-time service provided by the first service provider, the first content is transmitted to the second user device utilizing the deployed logic of the centralized environment at the at least one device within the predetermined proximity to the location of the first service provider;
   wherein the computer program is operable such that, in response to receipt of a third request to transmit a second content to the second user device, and a determination that the second user device utilizes the non-real-time service provided by the second service provider based on a type of the second content, the logic at the centralized environment is executed and the second content is transmitted to the second user device utilizing the non-real-time-service, such that use of the deployed logic at the at least one device for the transmission of the second content to the second user device is prevented.

2. The computer program of claim 1, wherein the real-time service includes at least one of call control and video control.

3. The computer program of claim 1, wherein the computer program is operable such that the real-time service is identified from a plurality of services managed for the first service provider by the centralized environment.

4. The computer program of claim 3, wherein the non-real-time service includes at least one of messaging, updating, browsing, and backing up data.

5. The computer program of claim 3, wherein the computer program is operable such that the non-real-time service is provisioned at a premise of the centralized environment.

6. The computer program of claim 5, wherein the premise of the centralized environment is distributed across a plurality of devices of the centralized environment such that computer program is operable to provision the non-real-time service across the plurality of devices of the centralized environment.

7. The computer program of claim 1, wherein the predetermined proximity includes a geographical region including the location of the first service provider.

8. The computer program of claim 7, wherein the geographical region includes a country.

9. The computer program of claim 1, wherein the predetermined proximity includes the location of the first service provider such that the logic of the centralized environment is deployed to the at least one device which is located at a premise of the first service provider.

10. The computer program of claim 9, wherein the at least one device includes a device of the first service provider.

11. The computer program of claim 1, wherein the logic of the centralized environment deployed to the at least one device includes a run-time logic activated within at least one of a service logic execution environment (SLEE) server and a Java execution environment (JEE) server.

12. The computer program of claim 11, wherein the at least one of the service logic execution environment (SLEE) server and the Java execution environment (JEE) server is also activated at the centralized environment, and the at least one of the service logic execution environment (SLEE) server and the Java execution environment (JEE) server is executed at the centralized environment for transmitting the second content to the second user device utilizing the non-real-time service.

13. A method, comprising:
exposing, by a centralized environment, a first service provided by a first service provider, and further exposing a second service provided by a second service provider, and, as a result of the exposure of the first service and the second service, managing both the first service for the first service provider and the second service for the second service provider;
identifying the first service of the first service provider as being a real-time service managed by the centralized environment; and
identifying the second service of the second service provider as being a non-real-time service managed by the centralized environment; and
in response to the identification of the first service of the first service provider as being the real-time service, deploying, from the centralized environment, logic of the centralized environment for the management of the real-time service to at least one device within a predetermined proximity to a location of the first service provider, wherein the deployed logic of the centralized environment is executable by the at least one device for managing the real-time service locally at the at least one device, such that:
in response to receipt of a first request to transmit a first content to a first user device and a determination that the first user device utilizes the real-time service provided by the first service provider, the first content is transmitted to the first user device utilizing the deployed logic of the centralized environment at the at least one device within the predetermined proximity to the location of the first service provider, and
in response to receipt of a second request to transmit the first content to a second user device and a determination that that the second user device utilizes the real-time service provided by the first service provider, the first content is transmitted to the second user device utilizing the deployed logic of the centralized environment at the at least one device within the predetermined proximity to the location of the first service provider;
wherein, in response to receipt of a third request to transmit a second content to the second user device, and a determination that the second user device utilizes the non-real-time service provided by the second service provider based on a type of the second content, the logic at the centralized environment is executed and the second content is transmitted to the second user device utilizing the non-real-time-service, such that use of the deployed logic at the at least one device for the transmission of the second content to the second user device is prevented.

14. A system comprising:
a processor for:
exposing, by a centralized environment, a first service provided by a first service provider, and further exposing a second service provided by a second service provider, and, as a result of the exposure of the first service and the second service, managing both the first service for the first service provider and the second service for the second service provider,
identifying the first service of the first service provider as being a real-time service managed by the centralized environment, identifying the second service of the second service provider as being a non-real-time service managed by the centralized environment, and
in response to the identification of the first service of the first service provider as being the real-time service, deploying, from the centralized environment, logic of the centralized environment for the management of the real-time service to at least one device within a predetermined proximity to a location of the first service provider, wherein the deployed logic of the centralized environment is executable by the at least one device for managing the real-time service locally at the at least one device, such that:
in response to receipt of a first request to transmit a first content to a first user device and a determination that the first user device utilizes the real-time service provided by the first service provider, the first content is transmitted to the first user device utilizing the deployed logic of the centralized environment at the at least one device within the predetermined proximity to the location of the first service provider, and
in response to receipt of a second request to transmit the first content to a second user device and a determination that that the second user device utilizes the real-time service provided by the first service provider, the first content is transmitted to the second user device utilizing the deployed logic of the centralized environment at the at least one device within the predetermined proximity to the location of the first service provider;

wherein the computer program is operable such that, in response to receipt of a third request to transmit a second content to the second user device, and a determination that the second user device utilizes the non-real-time service provided by the second service provider based on a type of the second content, the logic at the centralized environment is executed and the second content is transmitted to the second user device utilizing the non-real-time-service, such that use of the deployed logic at the at least one device for the transmission of the second content to the second user device is prevented.

15. The system of claim 14, wherein the processor is coupled to memory via a bus.

16. The system of claim 14, wherein deploying the logic to the at least one device includes delivering the logic to the at least one device, where a correct version of the logic is delivered based on the at least one device.

17. The system of claim 14, wherein the at least one device manages the real-time service by providing the real-time service to one or more customers of the first service provider.

18. The system of claim 14, wherein the at least one device manages the real-time service by maintaining the real-time service for use by the first service provider.

* * * * *

UNITED STATES PATENT AND TRADEMARK OFFICE
CERTIFICATE OF CORRECTION

| | | |
|---|---|---|
| PATENT NO. | : 8,924,526 B1 | Page 1 of 1 |
| APPLICATION NO. | : 12/643891 | |
| DATED | : December 30, 2014 | |
| INVENTOR(S) | : Nir Levy et al. | |

It is certified that error appears in the above-identified patent and that said Letters Patent is hereby corrected as shown below:

On the title page
Item (75) Inventors; second line please replace "Maccabirn" with --Maccabim--.

Signed and Sealed this
Twenty-sixth Day of April, 2016

Michelle K. Lee
*Director of the United States Patent and Trademark Office*